May 5, 1936.  A. B. FULLER  2,039,714
ELECTROMAGNETIC CLUTCH
Filed July 15, 1933
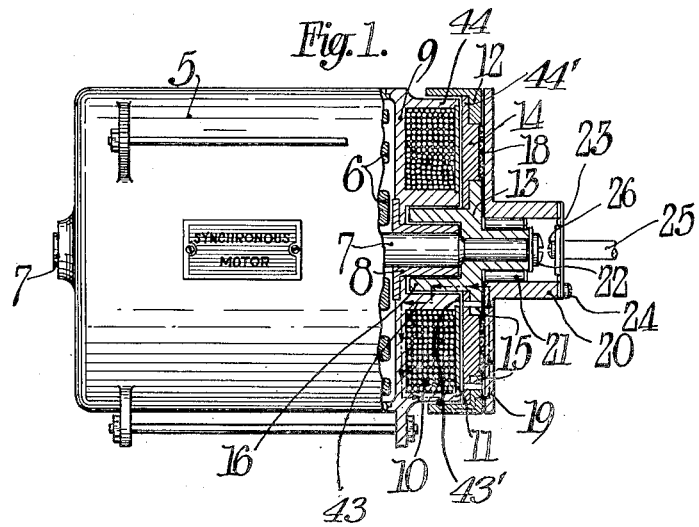
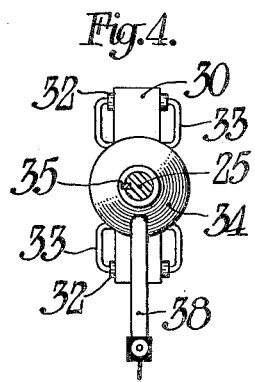
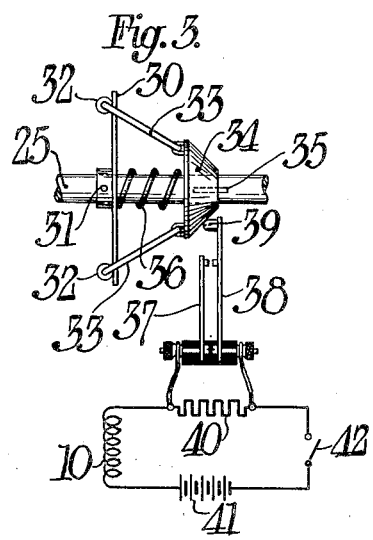
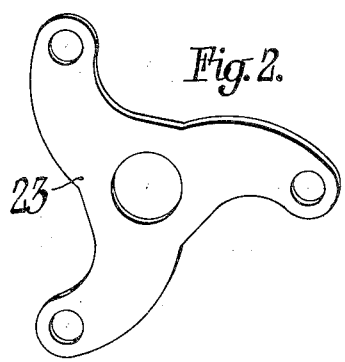
Inventor:
Albert B. Fuller
By Rolla N. Carter
Attorneys.

Patented May 5, 1936

2,039,714

UNITED STATES PATENT OFFICE 2,039,714

ELECTROMAGNETIC CLUTCH

Albert B. Fuller, Rochester, N. Y., assignor to Eastman Kodak Company, Rochester, N. Y., a corporation of New York Application July 15, 1933, Serial No. 680,601

1 Claim. (Cl. 192—84)

This invention relates to clutches and more particularly to magnetic clutches in which an electro-magnet engages the clutch by attracting an armature included in one of the clutch elements. In driving certain types of apparatus, such for example, as motion picture projectors, it is desirable to accelerate the machine smoothly to its running speed since in many cases the machine will operate improperly if accelerated too rapidly as by an ordinary induction motor. The constant speed property of a synchronous motor recommends the use of such a motor in a number of instances and on account of the limited synchronizing torque developed, it is common practice to start such motors unloaded and to apply the load through a clutch after synchronous speed has been reached. It is also necessary that the clutch pick up the load slowly enough so as not to over-load the motor and thereby pull it out of synchronism. A single disc magnetic clutch is well adapted for this purpose because the operating pressure between the clutch faces may be varied readily by controlling the current in the magnet, thus permitting the clutch to slip without any tendency to grab when first engaged and later to carry the full load without slipping.

Magnetic clutches in which the electro-magnet rotates with either the motor or the load requires the use of slip-rings for conducting the current to the coil and when carried by the motor the increased heavy rotating part is not only difficult to balance but its moment of inertia may easily be so large as to prevent a synchronous motor from pulling into synchronism or require a motor much larger than would be necessary if the added inertia of the rotating electro-magnet were not present. Similar objections arise if the electro-magnet it carried by the load since it not only increases the load but in many cases it would increase the size of the driven machine to an undesirable extent. This would be especially true in portable motion picture projectors where a premium is placed upon compactness.

In the present instance the electro-magnet is included to a certain extent in the motor structure itself and does not rotate with either the motor or the load. As a consequence of my invention the stationary electro-magnet requires no slip-rings and does not add to the inertia of any rotating part. Further my improved magnetic clutch is so constructed that the magnetic flux follows a radial path and accordingly does not introduce an appreciable amount of end thrust. By the present invention the clutch is formed of three parts, one of which is stationary and carries a coil and the other two of which are mounted within the field of the coil and form a part of the magnetic circuit for the same, shifting into and out of clutching relation without coming into contact with the stationary member of the clutch. The clutch may be employed for any uses where the transmission of power from one rotating element to another is desired to be discontinuous.

The novel features which I believe to be characteristic of my invention are set forth with particularity in the appended claim. My invention itself, however, as to its structure and method of operation will be best understood by reference to the following description taken in connection with the accompanying drawing in which:

Fig. 1 is a side view partially in section of a synchronous motor provided with the clutch of the present invention;

Fig. 2 is a perspective view of a flexible universal joint suitable for connecting the clutch disc to the shaft of the load;

Fig. 3 shows a control arrangement for impressing full operating voltage upon the clutch coil when the load has been accelerated to a predetermined speed; and Fig. 4 is an end view of the centrifugal switch-operating mechanism shown in Fig. 3.

Referring to the drawing, I have shown the motor element which, of course, may be any suitable source of power, as comprising a synchronous motor having the usual casing 5 which carries stator windings 6 and provided with a rotor having a shaft 7. The rotor 7 is supported in a bearing 8 carried by the end plate 9 of the motor 5 as clearly shown in Fig. 1. The motor end-plate 9 which forms a magnetic core is composed of iron and includes a pair of annular poles 43 and 44. Said annular poles 43 and 44 form an annular channel in which an exciting coil 10 is mounted and have respective end faces 43' and 44' which lie in the same plane. Ring 11 encloses the annular channel in end-plate 9, lies flush with the end faces 43' and 44' of said annular poles 43 and 44, and is composed of a low resistance, non-magnetic material, such as copper. An assembly consisting of an outer iron ring 12, an inner iron ring 13 and an intermediate non-magnetic ring 14 to which the rings 12 and 13 are secured in any suitable way as by rivets 15. The inner ring 13 is rigidly secured to the rotor shaft 7 by being pressed thereon and is provided with an integral cylindrical shell 16 which receives and is spaced from the bushing 8. The cylindrical shell 16 also extends into and is spaced from the inner annular pole 43 of the motor end-plate 9. The non-magnetic ring 14 of this assembly which rotates with the rotor shaft 7 is provided with a ring 18 of suitable friction material, which is preferably of a thickness such that it extends, in an axial direction, beyond the members 13 and 14. An iron armature disc 19 is provided with a hub portion 20 which is mounted on roller bearings 21 carried by a sleeve portion of the member 13 and held in place by a screw 22 threaded into the end of the rotor shaft 7. It is thus seen that the armature disc 19 is freely rotatable relative to the rotor shaft 7.

A flexible universal joint 23 is secured to the hub 20 of the armature disc 19 by screws 24 and to a shaft 25 by a screw 26. The load to be driven by the motor is connected to the shaft 25 and from a consideration of the universal joint 23, as shown specifically in Fig. 2, it will be seen that the armature disc 19 is free to move axially relatively to the load shaft 25 and the rotor 7 when attracted by the electro-magnet and the resiliency of the arms of the members 23 will restore the armature disc 19 to dis-engaged position when the electro-magnet is de-energized.

The operation of the clutch is as follows: When the coil 10 is energized a magnetic field is induced in the iron parts of the clutch and the magnetic flux flows across the radial air gap between the outer annular pole 44 of the motor end plate 9 and the inside of the over-hanging rotating member 12, thence through the disc armature 19 and back through the other rotating iron member 16, across the radial air gap between this member and the inner annular pole 43 of the end plate 9. The approximate path of the flux is indicated by the arrows in Fig. 1 and it will be observed that practically all of the flux flows across the radial air gaps between the stationary core of the winding 10 and the iron portions 12 and 16 of the rotating member carried by the rotor shaft 7. Hence the axial thrust is negligible and the radial thrusts are universally and symmetrically disposed so as to be counterbalanced. The thrust between the rotating members 12 and 17 and the armature disc 19 is axial and causes the disc 19 to bear against the friction member 19 which is of a thickness to prevent metallic contact. It is to be noted that the attraction of the armature 19 does not contribute to the axial thrust between the rotating assembly 12 and 16 and the stationary part of the clutch.

In use the synchronous motor is brought up to synchronous speed while the clutch is dis-connected and then slowly picks up the load connected to the shaft 25 when the clutch is connected. It is generally desirable to provide means for retarding the rate of increase of flux when the clutch is energized so as not to overload the motor in picking up the load. This result may be accomplished by causing the coil 10 to have a high inductance and further by making the low resistance ring 11 of copper so as to limit the inrush of current by virtue of the eddy-currents induced within the copper ring 11 during the transient period. In addition it is feasible to insert a fixed resistor in the clutch coil circuit so as to limit the initial energizing current of the coil 10 to a value low enough for the clutch to slip at first so as not to impose excess shock on either the motor or the driven machine. When the driven machine connected to the shaft 25 reaches a speed at which it is permissible to cause the clutch plate 19 to press more firmly against the friction material 18, the resistor may be short-circuited to impress full operating voltage upon the clutch coil. One suitable way of accomplishing this result will be described in connection with Figs. 3 and 4 in which the shaft 25 of the load is provided with a centrifugal switch which is here shown as comprising a flat plate 30 secured to the shaft 25 by a pin 31 and which furnishes a supporting surface for two rollers 32 which are connected by links 33 to a cone-shaped member 34 loosely mounted on a shaft 25 and restrained against rotation thereon by a suitable key 35. A compressed spring 36 surrounding the shaft 25 and positioned between the plate 30 and the member 34 tends to keep these last mentioned parts separated by a distance determined by the length of the links 33.

It will be obvious that the mechanism just described constitutes an adaptation of a fly-ball governor in which the rollers 32 constitute the balls and are moved outwardly upon rotation of the shaft 25. The outer movement of the rollers 32 decreases the spacing between the plate 30 and the member 34 against the compression of the spring 36 and, as is well known, may be adjusted so that at any desired critical speed the cone-shaped member 34 will be displaced a certain amount. If a switch member is arranged to be actuated by this movement of the cone-shaped member 34 it will be operative as a centrifugal switch. One suitable arrangement for making use of this centrifugal switch to function as above described is shown in Fig. 3 as comprising two spring contact arms 37 and 38 biased to contact-making position and held apart against such bias by means of the cone member 34, bearing against a projection 39 of any suitable non-conducting material carried by one of the spring arms 38. The switch just described is included in a circuit shunting a resistor 40 included in series with the clutch coil 10, a source of electric energy 41 and a switch 42. It is thus seen that with the motor 5 running, the closing of the switch 42 will energize the clutch coil 10 through the resistor 40 and thereby permit considerable slipping between the clutch faces during which time the shaft 25 of the load is turned over and when its speed reaches a predetermined critical value the centrifugal switch will close to short-circuit the resistor 40 and thereby impress full voltage on the clutch coil. It will be obvious that any other suitable arrangement may be made use of to energize the clutch coil 10 at an initial low voltage and after a time interval, empirically determined or as determined by the speed of the shaft 25, impressing full operating voltage upon the clutch coil 10.

My invention as above described provides an electro-magnetic clutch, the rotating parts of which are comparatively light and easily balanced and are so constructed that there is practically no axial thrust between the stationary parts of the clutch and the rotating core consisting of the members 12 and 13. The small amount of end thrust introduced by the force necessary to flex the spring joint 23 is found to be compensated by a leakage of the flux in an axial direction between the stationary core and the member rotating with the rotor 7. The clutch of my invention lends itself readily to a compact design and can be provided on the end of a motor without appreciably increasing the over-all length of the unit.

Although the several parts of the clutch comprising the magnetic circuit have been referred to as being of iron, it is to be understood that any suitable magnetic material may be employed. Also, the parts described as being of copper may be constructed from any other suitable non-magnetic material.

While I have described my invention in connection with a specific embodiment thereof, it is to be understood that my invention is not limited thereby inasmuch as various modifications will suggest themselves to those skilled in this art without departing from the spirit of my invention, the scope of which is pointed out in the appended claim.

What I claim as new and desire to secure by Letters Patent of the United States is:

A magnetic clutch comprising a stationary magnetic core provided with an electric coil, and having two annular poles with faces lying in a single plane, a disc armature occupying a plane substantially parallel to the plane of the faces of said poles, a member rotatable between said core and said armature and provided with two magnetizable rings magnetically separated and positioned in the paths of the magnetic flux flowing between the pole faces and said armature, said rings overlapping radially said annular poles whereby the magnetic flux crosses the air gaps between them in a radial direction, and a friction surface between said rotatable member and said armature whereby said armature will be caused to rotate with said rotatable member when the former is caused to have forceful contact with said friction surface when said coil is energized.

ALBERT B. FULLER.